Patented May 21, 1940

2,201,797

UNITED STATES PATENT OFFICE 2,201,797

PROCESS OF PRODUCING MOLDING COMPOSITION FROM LIGNIN AND FORMALDEHYDE

Clarence W. Scott, Moss Point, Miss.

No Drawing. Application October 22, 1937,
Serial No. 170,393

3 Claims. (Cl. 260—67)

This invention relates to a process of producing molding composition, and particularly a molding composition made from "lignin" obtained from the black liquor resulting from the digestion and pulping of coniferous wood in the soda or sulphate process.

The object of this invention is the production of a cheap, durable plastic composition utilizing in the main the waste products of the wood pulp industry.

A particular object of the invention is the provision of a simple, economical process for the production of a molding composition from the ligneous precipitate obtained by the treatment of black liquor with carbon dioxide or a mixture of gases containing carbon dioxide.

A further object of this invention is the production of a plastic composition from the lignin of coniferous woods, the lignin being precipitated from black liquor by passing waste combustion gases therethrough.

As is well known in the pulp and paper industry, the black liquor resulting from the digestion of coniferous woods by the soda or sulphate process contains in solution a considerable quantity of "lignin", which is the popular term for the compounds comprising the non-cellulose component of wood. These compounds are in solution in the alkaline liquor as it comes from the digester, together with more or less "soap", so-called, or the sodium salts of the fatty or resin acids. As heretofore known, where it was sought to separate the lignin from the liquor, the compounds comprising the lignin have been precipitated by adding a mineral acid, such as sulphuric or hydrochloric acid to the liquor, with or without allowing the "soap" to separate from the liquor. It has heretofore been proposed to react the lignin thus obtained with an aldehyde, such as formaldehyde, furfural, or acetaldehyde, and with one of the phenols to form a phenolic condensation product on the order of Bakelite. See U. S. patent to Connor No. 1,614,025, and to Collins No. 1,716,623, for examples of some of the prior proposed processes.

I have discovered that the lignin may be separated from the black liquor and a molding composition made more economically than by the prior methods known to me, by passing $CO_2$ gas, or a mixture of gases containing $CO_2$, such as waste combustion gases, through black liquor. The waste combustion gases from the power plant of a pulp or paper mill, as well as gases from lime kilns employed for reburning lime sludge, are rich in $CO_2$, and give excellent results in precipitating lignin from the black liquor. The reaction which occurs in the black liquor not only precipitates the lignin content therefrom, but there is a liberal evolution of hydrogen sulphide in commercial quantities which may be recovered. While the reaction occurring is not exactly known, the lignin behaves as a weak acid and is displaced from its salts by the action of $CO_2$ as carbonic acid. It is presumed to be somewhat as follows:

$Na_x$ (lignin) $+H_2CO_3 \rightarrow xNaHCO_3+$lignin $Na_x$ (lignin) $Na_2S+H_2CO_3 \rightarrow H_2S+NaHCO_3+$lignin

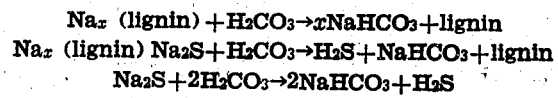

The $H_2S$ thus liberated may be collected and separated from other gases by known methods. The lignin precipitated by this method differs from that disclosed in the Conner and Collins patents aforesaid, in that it is a water soluble product, insoluble in the mother liquor, instead of an insoluble product. It is also more reactive with the aldehydes than lignin precipitated with mineral acids. It may be separated from the black liquor by filtration and may be washed in acidulated water or alcohol in which it is insoluble. The water or alcohol may be acidulated by a small amount of hydrochloric or sulphuric, or other acid.

The lignin thus obtained may be dried and molded under heat and pressure, with or without binding agents, or it may be polymerized with an aldehyde with or without the addition of phenol, and molded in a manner similar to phenolaldehyde resins. Following are some specific examples of the carrying out of my improved process.

Example 1

Black liquor from the diffusers was first salted to separate the soap therefrom, adding about one pound of salt per gallon of black liquor. After standing for twenty-four hours, any soap which floated to the top was skimmed off. I have found that it is highly important that the soap be separated from the liquor before precipitating the lignin. Otherwise the precipitated material is difficult to filter. Gases containing $CO_2$ were then passed through the liquor. Hydrogen sulphide in liberal quantities was evolved and the lignin content of the black liquor precipitated. Waste combustion gases containing $CO_2$ have been used with equal effect.

The precipitated lignin was separated from the black liquor by filtration. It is a substance dark brown in color. It is soluble in plain wash water, whereas that precipitated with sulphuric and hydrochloric acids is insoluble. In order to wash the lignin precipitated by $CO_2$, the wash water should be acidulated by the addition of an acid. I have also found that lignin precipitated by $CO_2$ is more reactive than acid precipitated lignin. After drying, the lignin thus obtained may be molded without further treatment, and it would be suitable for some purposes. Where a stronger, chemically more resistant material is desired, it should be further treated.

100 grams of the dried lignin, obtained as just described, was stirred in approximately 1000 c. c. of water until thoroughly dispersed, as evidenced by absence of sediment. To this dispersion, 200 c. c. of formaldehyde (40%) and 20 grams of hexamethylenetetramine were added and the solution heated to boiling for one hour. It was then acidified with sulphuric acid, again brought to boiling, and the precipitated resin was filtered, washed, dried and ground. The resulting product is a greenish brown powder. It may be molded to a hard dense material under pressure from 1000 to 3000 pounds per square inch, and at a temperature from 100 to 300° C. If desired, any suitable filler, such as wood flour, may be added before molding.

Example 2

Another procedure which I have followed with equal success and obtained a lighter colored final product was to proceed as in the foregoing example, except that after the lignin was dispersed in water, as described, sufficient aqua-ammonia was added to dissolve the lignin and produce a clear solution, rather than a muddy dispersion. 200 c. c. of strong ammonia water should be sufficient to dissolve 100 grams of lignin. To this solution, 200 c. c. of 40% formaldehyde were added and the same procedure heretofore described followed. The resulting material is fine grained and powdery, with a yellow tinge rather than greenish, as in the previously described example.

Example 3

Proceed as in Example 2, except that the solution, after the addition of formaldehyde and hexamethylenetetramine, is not acidified to precipitate the resin, but is evaporated to dryness and then ground to the proper fineness.

Many variations of the foregoing examples will suggest themselves. For example, the addition of hexamethylenetetramine, as set forth in Examples 1 and 3, may be omitted. Also, if desired, a phenol may be employed, as in prior known processes. Also, as is well known, the surface color and texture may be varied by known means of coloring, veneering, or like steps.

From the foregoing it will be apparent that I have devised an improved process for producing plastic compositions from the lignin content in black liquor.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A process of producing a molding composition from the lignin contained in black liquor which comprises passing waste combustion gases through the black liquor to precipitate the lignin, washing the lignin in acidulated water, dissolving the lignin with ammonia in water, and reacting with formaldehyde.

2. A process of producing a molding composition from the lignin contained in black liquor which comprises separating the lignin from the black liquor, dissolving it in ammonia, reacting the dissolved lignin with formaldehyde to form a resinous product, and evaporating to dryness.

3. A process of producing a molding composition from the lignin contained in black liquor which comprises passing waste combustion gases through the black liquor to precipitate the lignin, washing the lignin in acidulated water, adding ammonia to dissolve the lignin, reacting with formaldehyde to form a resinous product, evaporating to dryness, and grinding.

CLARENCE W. SCOTT.